US012794507B2

(12) United States Patent
Shen

(10) Patent No.: US 12,794,507 B2
(45) Date of Patent: Nov. 10, 2026

(54) RADIO FREQUENCY POWER SUPPLY ADJUSTMENT METHOD, APPARATUS AND DEVICE, AND STORAGE MEDIUM

(71) Applicant: ZTE CORPORATION, Shenzhen (CN)

(72) Inventor: Shaowu Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 763 days.

(21) Appl. No.: 18/246,426

(22) PCT Filed: Aug. 5, 2021

(86) PCT No.: PCT/CN2021/110922
§ 371 (c)(1),
(2) Date: Mar. 23, 2023

(87) PCT Pub. No.: WO2022/073379
PCT Pub. Date: Apr. 14, 2022

(65) Prior Publication Data

US 2023/0361806 A1 Nov. 9, 2023

(30) Foreign Application Priority Data

Oct. 9, 2020 (CN) ......................... 202011074821.1

(51) Int. Cl.
*H04B 1/40* (2015.01)
*H02M 3/158* (2006.01)
*H04B 1/04* (2006.01)

(52) U.S. Cl.
CPC .............. *H04B 1/40* (2013.01); *H02M 3/158* (2013.01); *H04B 1/0475* (2013.01)

(58) Field of Classification Search
CPC .... H04B 7/0617; H04B 1/0071; H04B 1/707; H04B 1/7102; H04B 2201/70715;
(Continued)

(56) References Cited

U.S. PATENT DOCUMENTS

2006/0128324 A1 6/2006 Tan et al.
2019/0380110 A1* 12/2019 Zhang .................. H04W 72/04

FOREIGN PATENT DOCUMENTS

CN 201733279 U 2/2011
CN 107070486 A 8/2017
(Continued)

OTHER PUBLICATIONS

International Searching Authority. International Search Report and Written Opinion for PCT Application No. PCT/CN2021/110922 and English translation, mailed Oct. 28, 2021, pp. 1-15.
(Continued)

*Primary Examiner* — Ajibola A Akinyemi
(74) *Attorney, Agent, or Firm* — Vivacqua Crane, PLLC

(57) ABSTRACT

A radio frequency power supply adjustment method, apparatus and device, and a storage medium are disclosed. The radio frequency power supply adjustment method may include: acquiring radio frequency interference information (S1100); determining, according to the radio frequency interference information, correlation information between the radio frequency interference information and a radio frequency power supply status (S1200); and adjusting the radio frequency power supply status according to the correlation information (S1300).

18 Claims, 5 Drawing Sheets

(58) Field of Classification Search
CPC .... H04B 7/10; H04B 1/0475; H04B 7/18591; H04B 1/0483; H04B 1/1027; H04B 1/1036; H04B 1/109; H04B 15/00
USPC ........................................................ 455/127.1
See application file for complete search history.

(56) References Cited

FOREIGN PATENT DOCUMENTS

| | | | |
|---|---|---|---|
| CN | 107147450 | A | 9/2017 |
| CN | 107277912 | A | 10/2017 |
| CN | 108063646 | A | 5/2018 |
| CN | 108541060 | A | 9/2018 |
| CN | 108649907 | A | 10/2018 |
| CN | 108650035 | A | 10/2018 |
| CN | 108683413 | A | 10/2018 |
| CN | 108901031 | A | 11/2018 |
| CN | 109510634 | A | 3/2019 |
| CN | 110430001 | A | 11/2019 |
| CN | 211352201 | U | 8/2020 |
| CN | 112532053 | A | 3/2021 |

OTHER PUBLICATIONS

The State Intellectual Property Office of People's Republic of China. First Office Action for CN Application No. 2020110748211 and English translation, mailed Aug. 16, 2021, pp. 1-7.
The State Intellectual Property Office of People's Republic of China. First Search Report for CN Application No. 2020110748211 and English translation, mailed Aug. 9, 2021, pp. 1-5.
The State Intellectual Property Office of People's Republic of China. Supplementary Search Report for CN Application No. 2020110748211 and English translation, mailed Feb. 9, 2021, pp. 1-4.

* cited by examiner

RADIO FREQUENCY POWER SUPPLY ADJUSTMENT METHOD, APPARATUS AND DEVICE, AND STORAGE MEDIUM

CROSS-REFERENCE TO RELATED APPLICATION

The present application is a national stage filing under 35 U.S.C. § 371 of international application number PCT/CN2021/110922, filed Aug. 5, 2021, which claims priority to Chinese patent application No. 202011074821.1 filed Oct. 9, 2020. The contents of these applications are incorporated herein by reference in their entirety.

TECHNICAL FIELD

The present disclosure relates to radio frequency communication technologies, and in particular, to a radio frequency power supply adjustment method, apparatus and device, and a storage medium.

BACKGROUND

With the development of radio frequency communication technologies from, for example, 2G, 3G, 4G to 5G, the frequency is getting higher and higher, the power is getting larger and larger, and the peak-to-average is also getting higher and higher, posing higher requirements on the linearity and power consumption of Power Amplifiers (PAs). It is necessary to ensure a large power, improve transmission modulation performance, and reduce current power consumption, heat generation, and interference by the power source, which brings great challenges to the PA power source design of radio frequency communication devices.

In some cases, the PA power source design of radio frequency communication devices generally adopts a fixed power source radio frequency power supply mode, which cannot be flexibly adjusted and switched, and has low anti-interference performance.

SUMMARY

Embodiments of the present disclosure provide a radio frequency power supply adjustment method, apparatus and device, and a storage medium.

In accordance with a first aspect of the present disclosure, an embodiment provides a radio frequency power supply adjustment method. The method may include: acquiring radio frequency interference information; determining, according to the radio frequency interference information, correlation information between the radio frequency interference information and a radio frequency power supply status; and adjusting the radio frequency power supply status according to the correlation information.

In accordance with a second aspect of the present disclosure, an embodiment provides a radio frequency power supply adjustment apparatus. The apparatus may include: an acquisition module, configured for acquiring radio frequency interference information; a correlation information determination module, configured for determining, according to the radio frequency interference information, correlation information between the radio frequency interference information and a radio frequency power supply status; and a power supply status adjustment module, configured for adjusting the radio frequency power supply status according to the correlation information.

In accordance with a third aspect of the present disclosure, an embodiment provides an electronic device. The device may include: a memory, a processor, and a computer program stored in the memory and executable by the processor which, when executed by the processor, causes the processor to perform the radio frequency power supply adjustment method in accordance with the first aspect.

In accordance with a fourth aspect of the present disclosure, an embodiment provides a computer-readable storage medium, storing a computer-executable instruction for performing the radio frequency power supply adjustment method in accordance with the first aspect.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims, and accompanying drawings.

DETAILED DESCRIPTION

Figure 1:
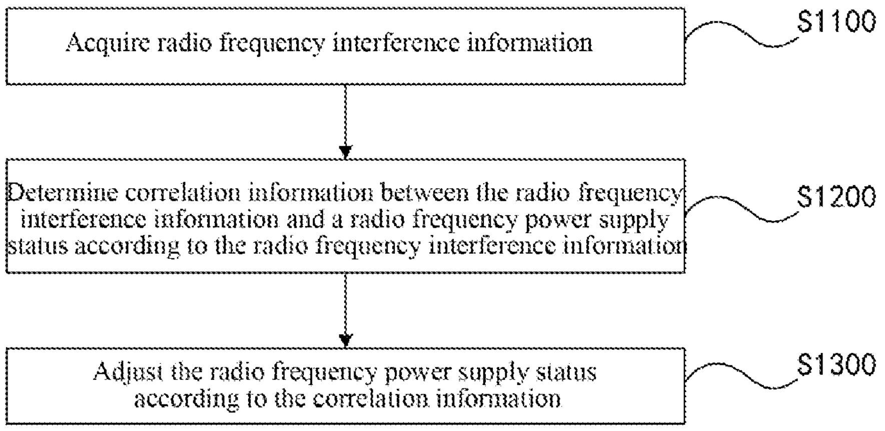
FIG. 1 is a schematic flowchart of a radio frequency power supply adjustment method according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure. The embodiments of the present disclosure and the features in the embodiments may be combined with each other to derive other embodiments not explicitly described.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish between similar objects, and are not necessarily used to describe a specific sequence or a precedence order.

With the development of radio frequency communication technologies from, for example, 2G, 3G, 4G to 5G, the frequency is getting higher and higher, the power is getting larger and larger, and the peak-to-average is also getting higher and higher, posing higher requirements on the linearity and power consumption of Power Amplifiers (PAs). It is necessary to ensure a large power, improve transmission modulation performance, and reduce current power consumption, heat generation, and interference by the power source, which brings great challenges to the PA power source design of radio frequency communication devices.

In some example scenarios, in order to save electricity, prolong the standby time and obtain better PA performance while increasing the power, a variety of PA power supply technologies, such as Bypass, Average Power Tracking (APT), Enhanced Power Tracking (EPT) and Envelope Tracking (ET), are introduced in intelligent terminals.

The APT refers to an average power tracking mode. The EPT refers to an enhanced APT technology, i.e., enhanced power tracking. In this mode, similar to the ET mode, a PA operates in a compression mode, but does not perform envelope tracking. Compared with the average power tracking technology, in the ET mode, the ET technology is more like customized on demand, and a power supply voltage of a radio frequency power amplifier changes with an envelope of an input signal. Envelope tracking can improve the energy efficiency of radio frequency power amplifiers. Different from current fixed-power systems, the envelope tracking technology is more and more widely applied to optimize the power added efficiency (PAE) of radio frequency power amplifiers. In particular, because 5G New Radio (NR) has high frequency, large loss and high peak-to-average ratio (PAR), envelope tracking can provide a possible scheme to help solve the above mobile radio frequency front-end design problems. Envelope tracking can dynamically adjust the DC power source voltage according to the "envelope" of the input signal of the power amplifier, and only provide a high voltage required by components when necessary, thereby reducing the battery consumption and improving the heat dissipation of the power amplifier.

In some cases, the PA power source design of radio frequency communication devices generally adopts a fixed power source radio frequency power supply mode, which cannot be flexibly adjusted and switched, and has low anti-interference performance. For example, in a relevant PA power supply circuit, the power supply mode to be used is already fixed at the beginning of the design, or is only affected by the power. For example, an APT mode is used when the power is below 15 dB, an EPT mode is used when the power ranges from 15 dB to 19 dB, and an ET mode is used when the power is above 19 dB. For such a design, the power supply mode cannot be switched in the case of interference by the power source or deterioration of other radio frequency indicators caused by the power source. In addition, the power supply mode under certain bandwidth is also relatively fixed and cannot be adjusted adaptively.

In view of the above, embodiments of the present disclosure provide a radio frequency power supply adjustment method, apparatus and device, and a storage medium, to flexibly adjust the power supply status of a radio frequency power source, thereby effectively improving the anti-interference performance of a radio frequency communication device.

It should be noted that in the following embodiments, the radio frequency communication device may be a terminal, a network device, etc. The terminal may be a mobile terminal device or a non-mobile terminal device. The mobile terminal device may be a mobile phone, a tablet computer, a notebook computer, a handheld computer, a vehicle-mounted terminal device, a wearable device, an ultra-mobile personal computer, a netbook, a personal digital assistant, a CPE, or a wireless hotspot device (UFI), etc. The non-mobile terminal device may be a personal computer, a television, a teller machine, or a self-service machine, etc. The network device may be a device configured for communicating with a terminal device. The network device may include a base station, a repeater or other network side device with similar functions. The radio frequency communication device may be an electronic device with a single radio frequency module or an electronic device with multiple sets of radio frequency modules. The multiple sets of radio frequency modules may be at least one of a 5G radio frequency module, a 4G radio frequency module, a 3G radio frequency module, a 2G radio frequency module, a Wi-Fi radio frequency module, a GPS radio frequency module, or the like, which is not limited in the embodiments of the present disclosure. The embodiments of the present disclosure are described in detail below by taking the radio frequency communication device being a mobile phone as an example.

In accordance with a first aspect of the present disclosure, referring to FIG. 1, an embodiment provides a radio frequency power supply adjustment method. The method includes following steps S1100 to S1300.

At S1100, radio frequency interference information is acquired.

At S1200, correlation information between the radio frequency interference information and a radio frequency power supply status is determined according to the radio frequency interference information.

At S1300, the radio frequency power supply status is adjusted according to the correlation information.

In some embodiments, the radio frequency interference information in S1100 is information that can be used to reflect and describe an interference status generated at a signal frequency received by a radio frequency device or at a frequency very close to this frequency. For example, the radio frequency interference information can reflect whether there is interference in the signal received by the radio frequency device, the type of interference (e.g., interference from a B3 band of 4G LTE and an N78 band of 5G NR, interference from a B41 band of 4G LTE and an N41 band of 5G NR, interference from WIFI and an N79 band of 5G NR, or interference from MMW and GPS), the degree of interference (e.g., severe, moderate, slight), and other parameter information.

Figure 2:
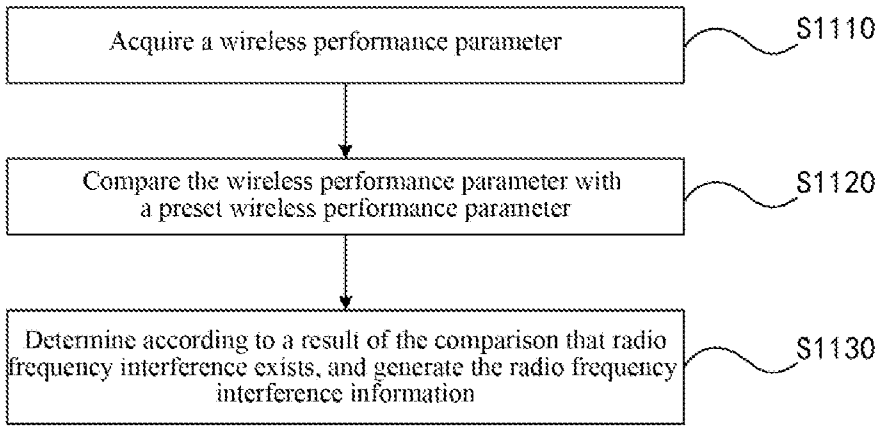
FIG. 2 is a schematic flowchart of a radio frequency power supply adjustment method according to another embodiment of the present disclosure.

In some embodiments, referring to FIG. 2, S1100 includes the following operations S1110 to S1130.

At S1110, a wireless performance parameter is acquired.

At S1120, the wireless performance parameter is compared with a preset wireless performance parameter.

At S1130, it is determined according to a result of the comparison that radio frequency interference exists, and the radio frequency interference information is generated.

In some embodiments, the wireless performance parameter in S1110 may be a parameter reflecting the wireless network performance. For example, for radio frequency devices (such as mobile phones) in 2G, 3G, 4G or 5G mobile communication networks, the wireless performance parameter may include at least one of a Reference Signal Receiving Power (RSRP) value, a Received Signal Strength Indication (RSSI) value, a Signal Noise Ratio (SNR) value, a Channel Quality Indication (CQI) value, an uplink/downlink bit error rate, a Modulation and Coding Scheme (MCS) modulation mode, a rank, an Error Vector Magnitude (EVM), an Adjacent Channel Leakage Ratio (ACLR), sensitivity, or the like.

In some embodiments, the wireless performance parameter may be acquired using an interference self-scanning module of a mobile phone. The interference self-scanning module may be configured for scanning channel interference and non-channel interference, and may also be configured for scanning channel interference under different radio frequency power supply statuses.

The interference self-scanning module is connected to an antenna unit and a radio frequency transceiver that are built in the mobile phone, and is configured for detection of self-transmitting self-receiving interference of a radio frequency signal, that is, self-transmitting self-receiving processing of signals of path interference test units of radio frequency. For example, for a mobile phone with a 4G LTE radio frequency module and a 5G NR radio frequency module, changes in the RSRP value and the SNR value of two frequency bands in a coexistence state can be detected based on a self-transmitting self-receiving E-UTRA-NR Dual Connectivity (ENDC) harmonic detection algorithm of the mobile phone, and compared with the preset wireless performance parameters to determine whether ENDC interference occurs. A self-transmitting self-receiving harmonic and intermodulation interference algorithm may not require the use of a third-party instrument. A radio frequency chip is used to input a certain signal level or transmit power, e.g., a maximum transmit power of −85 dB and 23 dB, in a corresponding frequency band, frequency channel number or channel, bandwidth and other wireless setting parameters (such as resource block (RB) number, slot number, modulation mode, multi-stream rank number, etc.) in 4G LTE. Then, a radio frequency chip is used to input a certain signal level or transmit power, e.g., −85 dB, in a corresponding frequency band, frequency channel number or channel, bandwidth and other wireless configuration information (such as resource block (RB) number, slot number, modulation mode, multi-stream rank number, etc.) in 5G NR. In addition, 4G LTE is set as a transmitting interference path and NR is set as a receiving interference path. An NR signal level, e.g., −87 dB, received by a receiving and scanning terminal is compared with a preset wireless performance parameter (e.g., a reference RSRP value of −85 dB), it can be seen that there is currently 2 dB harmonic interference. In addition, if 5G NR is a signal transmitting end (transmitting interference path), and 4G LTE is a signal receiving end (receiving interference path), a 4G LTE signal level, e.g., −90 dB, received by the receiving and scanning terminal is compared with a preset wireless performance parameter (e.g., a reference RSRP value of −85 dB), and it can be seen that there is currently 5 dB intermodulation interference.

In some embodiments, the interference self-scanning module is further configured for self-transmitting and self-testing of the EVM and ACLR indicators of the terminal, using a radio frequency test program built in the terminal to control the terminal to carry out modulation and demodulation tests, and performing self-transmitting self-receiving collection of a tested value such as EVM, ACLR or sensitivity without the use of an instrument. The collected value is used for the judgment and feedback of radio frequency power supply interference.

In some embodiments, the radio frequency power supply status includes at least one of a radio frequency power supply mode, a radio frequency power supply parameter, or a power source concurrent interference suppression coexistence parameter. The radio frequency power supply mode includes a Bypass mode, an APT mode, an EPT mode, an ET mode, etc. The radio frequency power supply parameter includes at least one of a power supply voltage (radio frequency power supply voltage), a Radio frequency Gain Index (RGI) value, ICQ (collector current at a quiescent operation point), an RGI range, a compression point, a Vmin (minimum voltage) value, or a Vmax (maximum voltage) value, etc. The power source concurrent interference suppression coexistence parameter includes at least one of a coexistence power control parameter, a coexistence bandwidth limit parameter, a coexistence power source power supply mode matching parameter, a coexistence power source parameter matching parameter, a coexistence PA operating mode parameter, or a coexistence isolation improvement parameter, etc.

In some embodiments, the radio frequency power supply adjustment method is applied to an electronic device (radio frequency communication device) with multiple sets of radio frequency modules. The multiple sets of radio frequency modules include at least one of a 5G radio frequency module, a 4G radio frequency module, a 3G radio frequency module, a 2G radio frequency module, a Wi-Fi radio frequency module, or a GPS radio frequency module, etc.

In some embodiments, the radio frequency communication device may include multiple sets of radio frequency modules, and each set of radio frequency modules includes a radio frequency chip and a PA chip. For example, a 5G terminal may include (at least one sets of) 5G radio frequency module(s), a 4G radio frequency module, a 3G radio frequency module, and a 2G radio frequency module. The multiple sets of 5G radio frequency modules correspond to multiple sets of NR radio frequency chips and PA chips. The 4G radio frequency module, the 3G radio frequency module and the 2G radio frequency module each includes a 2G/3G/4G radio frequency chip and a PA chip. Power supply of the multiple sets of radio frequency modules is relatively independent, i.e., multiple sets of power sources and DC-DC power conversion circuits are required. In a 5G NR terminal, an NR frequency band (such as N77, N78, N79 or N41) has two transmitting TX circuits, and each transmitting circuit requires an independent power amplifier, i.e., the two TX circuits correspond to two sets of 5G radio frequency modules. Taking the N41 frequency band as an example, there are two circuits TX1 and TX2 for uplink transmissions. In an uplink multiple-input multiple-output (UL-MIMO) mode, the two circuits TX1 and TX2 need to operate at the same time, to be specific, PA chips PA1 and PA2 corresponding to TX1 and TX2 also operate at the same time. In this case, two power sources DC-DC1 and DC-DC2 corresponding to PA1 and PA2 also operate at the same time. The two DC-DCs are mainly responsible for the control and conversion of the power supply and supply voltage of the two PA chips. For another example, referring to FIG. 3, a 5G terminal 100 may include a 5G radio frequency module 110 and a 4G radio frequency module 120. The 5G radio frequency module 110 includes an antenna, an NR radio frequency chip, a PA chip, and a DC-DC circuit connected in sequence. The 4G radio frequency module 120 includes an antenna, an LTE radio frequency chip, a PA chip, and a DC-DC circuit connected in sequence. When the two radio frequency modules need to operate at the same time, the PA chips PA1 and PA2 also operate at the same time. In this case, two power sources DC-DC1 and DC-DC2 corresponding to PA1 and PA2 also operate at the same time. The two DC-DC power sources are mainly responsible for the control and conversion of the power supply and supply voltage of the two PA chips.

In some embodiments, the multiple sets of radio frequency modules include at least two sets of radio frequency modules. The radio frequency power supply status includes a power source concurrent interference suppression coexistence parameter.

Figure 4:
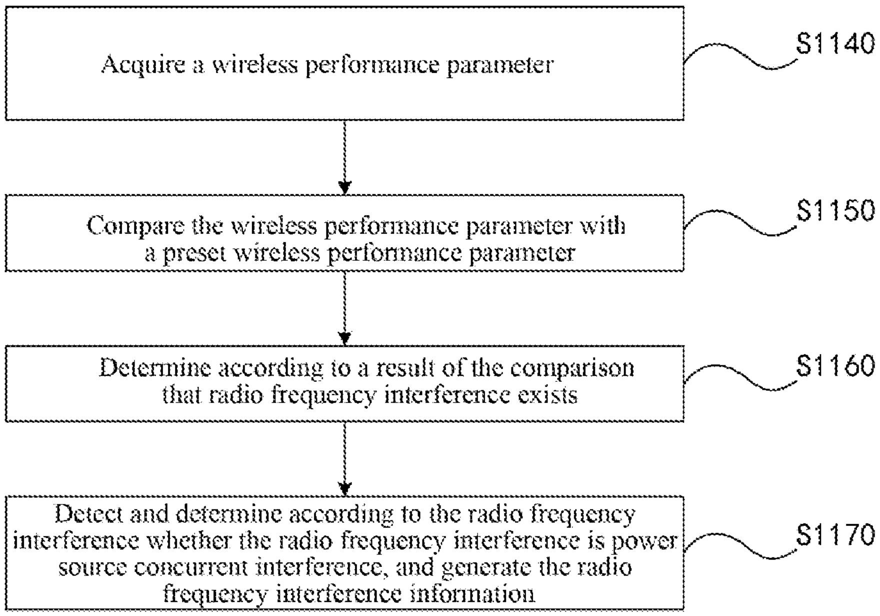
FIG. 4 is a schematic flowchart of a radio frequency power supply adjustment method according to another embodiment of the present disclosure.

Referring to FIG. 4, acquiring radio frequency interference information in S1100 includes following steps S1140 to S1170.

At S1140, a wireless performance parameter is acquired.

At S1150, the wireless performance parameter is compared with a preset wireless performance parameter.

At S1160, it is determined according to a result of the comparison that radio frequency interference exists.

At S1170, it is detected and determined, according to the radio frequency interference, whether the radio frequency interference is power source concurrent interference, and the radio frequency interference information is generated.

In some embodiments, in the process of concurrent operation of the multiple sets of radio frequency modules, multiple DC-DC power sources operate in parallel, leading to a concurrent interference problem. For example, in a 5G NR terminal, when multiple sets of NR radio frequency modules perform transmission concurrently, a concurrent interference problem is likely to occur, affecting the wireless performance parameters of a combined TX, e.g., leading to the deterioration of ACLR, EVM and other indicators, resulting in a high uplink bit error rate, and consequently affecting the actual uplink throughput performance of users. In order to solve this concurrent interference problem, a concurrent interference suppression mechanism is introduced in the embodiments of the present disclosure. An operational procedure of this mechanism is as follows: When it is detected and determined by performing steps S1140, S1150 and S1160 that the radio frequency communication device is in an abnormal operating state and there is radio frequency interference, such as low throughput and high bit error rate, S1170 is performed to determine whether the terminal is in a concurrent state at that time, determine whether the concurrent state is a concurrent state between multiple NR radio frequency modules (such as TX1 and TX2 of N41, N77, N78 and N79) or a concurrent state between an NR radio frequency module and a radio frequency module of another standard (LTE/WCDMA/CDMA/GSM), and determine which DC-DC power source circuits are operating, to detect and determine whether the radio frequency interference is power supply concurrent interference. For example, a concurrent mode control program may be used to switch the terminal to an intermittent transient TX only mode, i.e., only one set of radio frequency modules (the corresponding PA chips and power supply chips) are enabled to operate, so as to determine which set of radio frequency modules is the main interference factor, and generate radio frequency interference information. Then, a power source correlation coefficient calculation module is used to perform S1200 to identify radio frequency power supply modes (ET/EPT/APT/BYPASS, etc.) or radio frequency power supply parameters (Vmax value, Vmin value, compression point, ICQ, etc.) that are related to the current interference. In addition, a correlation between a current radio frequency interference and concurrent power value (e.g., −30 dB to 28 dB), an operating bandwidth (e.g., 20 M/40 M/60 M/80 M/100 M), a PA operating mode, and the like can further be determined, so as to determine correlation information between the radio frequency interference information and the radio frequency power supply status. In some embodiments, the correlation information is a parameter that characterizes the correlation between the radio frequency power supply status and the radio frequency interference information, and is used to characterize the impact of the radio frequency power supply status on the radio frequency interference information. The correlation information may be a Boolean value, which is used to characterize whether the radio frequency power supply status affects the radio frequency interference information (whether the radio frequency interference is caused by the radio frequency power supply status). The correlation information may also be a degree value, e.g., a correlation coefficient, which is used to quantitatively characterize the degree of correlation between the radio frequency power supply status and the radio frequency interference information, i.e., to characterize the degree to which the radio frequency power supply status affects the radio frequency interference information.

Figure 3:
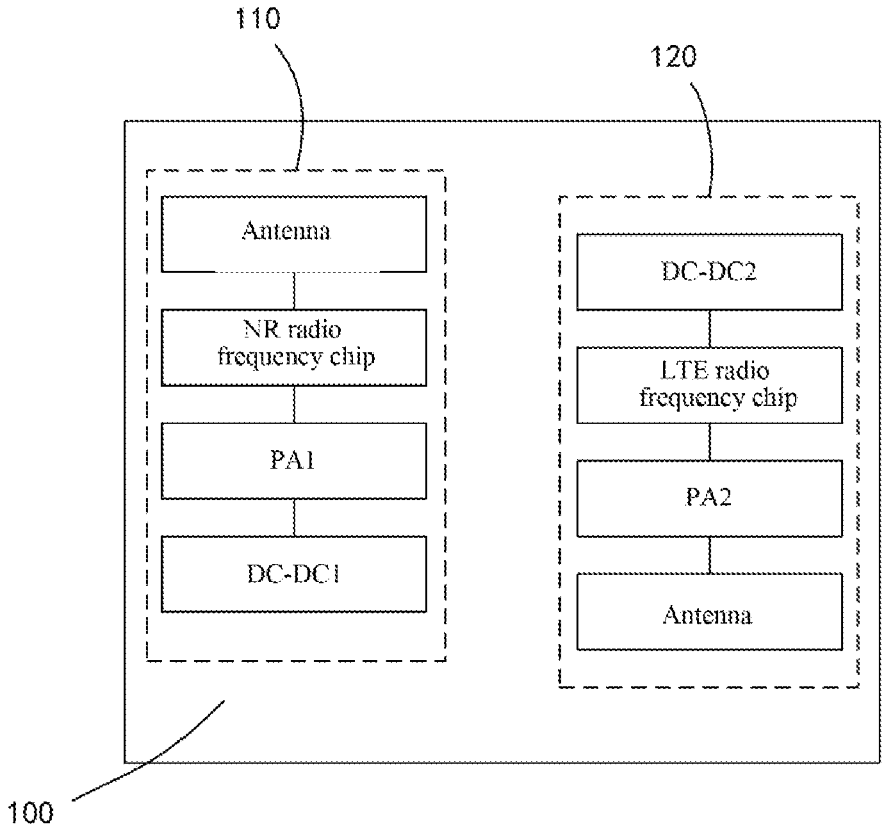
FIG. 3 is a schematic structural diagram of a radio frequency communication device in a radio frequency power supply adjustment method according to an embodiment of the present disclosure.

In some embodiments, referring to FIG. 3, the radio frequency communication device 100 includes at least a 5G radio frequency module 110 and a 4G radio frequency module 120.

In some embodiments, acquiring radio frequency interference information in S1100 further includes a following step S1180.

At S1180, it is determined according to a result of the comparison that ENDC interference exists, and the radio frequency interference information is generated.

In some embodiments, an ENDC interference detection unit may be used to determine whether ENDC interference exists, and generate the radio frequency interference information. For example, the ENDC interference detection unit may be connected to the interference self-scanning module and configured for acquiring a current ENDC interference status of the terminal. When the radio frequency communication device operates in the ENDC state, the detection unit first detects whether there is interference, and detects a standard and frequency band combination that causes the interference. For example, it is determined by detection the type of the interference, for example, interference from the B3 band of 4G LTE and the N78 band of 5G NR, interference from the B41 band of 4G LTE and the N41 band of 5G NR, interference from WIFI and the N79 band of 5G NR, interference from MMW and GPS, etc. The ENDC interference from 4G LTE and 5G NR can be detected and determined through the detection of self-transmitting self-receiving interference of the radio frequency signal. Other standard and frequency band combinations that cause the interference may also be detected and determined by a similar method, and the details will not be repeated herein again. When detecting a deterioration of performance using the interference self-scanning module (e.g., by comparing the detected wireless performance parameter with a preset wireless performance parameter), the radio frequency communication device randomly activates the ENDC interference detection unit to detect whether there is interference in the current radio frequency communication device status and basic wireless configuration information (such as RB number, slot number, modulation mode, multi-stream rank number, etc.) that causes the interference, and determines whether there is ENDC interference by comparing the wireless performance parameter with the preset wireless performance parameter. If the wireless performance parameter significantly decreases, deteriorates or is lower than levels of other radio frequency communication devices, it indicates that there is ENDC interference, and the radio frequency interference information corresponding to the ENDC interference is generated. It should be noted that the ENDC interference is only an example, and radio frequency power supply interference may not only exist in a non-standalone (NSA) mode, but also exist in a standalone (SA) mode.

In some embodiments, the correlation information includes a correlation coefficient.

Figure 5:
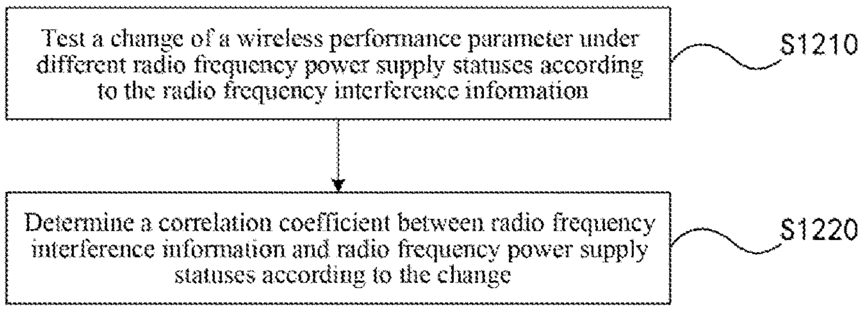
FIG. 5 is a schematic flowchart of a radio frequency power supply adjustment method according to another embodiment of the present disclosure.

Referring to FIG. 5, determining, according to the radio frequency interference information, correlation information between the radio frequency interference information and a radio frequency power supply status in S1200 includes the following steps S1210 and S1220.

At S1210, a change of a wireless performance parameter under different radio frequency power supply statuses is tested according to the radio frequency interference information.

At S1220, a correlation coefficient between the radio frequency interference information and the radio frequency power supply statuses is determined according to the change.

In some embodiments, the power source correlation coefficient calculation module can be used to calculate the correlation coefficient between the radio frequency interference information and the radio frequency power supply status, and can also be used to determine whether the radio frequency interference is caused by the PA power source and whether it is necessary to start a power supply anti-interference control program to control the radio frequency power supply status.

In some embodiments, when receiving the radio frequency interference information and determining that the radio frequency communication device currently experiences interference, the power source correlation coefficient calculation module collects wireless performance parameters obtained through testing by the interference self-scanning module under different radio frequency power supply modes and radio frequency power supply parameters, and determines whether the current interference is related to a power source. For example, if a wireless performance parameter such as uplink/downlink throughput, SNR or RSRP collected by the radio frequency communication device under a current default radio frequency power supply mode and radio frequency power supply parameter is abnormal or exceeds a default value (preset wireless performance parameter) stored in a parameter storage module by a certain threshold, it indicates that interference exists in the current operating mode of the terminal. If the wireless performance parameter changes significantly with different power supply modes and power supply parameters, it indicates that there is a correlation. The value of the correlation is stored as a correlation coefficient in the parameter storage module. In some embodiments, a higher correlation between the radio frequency interference information and the radio frequency power supply status indicates a larger correlation coefficient. The relationship between the correlation and the corresponding correlation coefficient may be set according to actual needs. For example, the radio frequency power supply status includes four state parameters A, B, C, and D (where the state parameters correspond to specific radio frequency power supply modes, and may also correspond to specific radio frequency power supply parameters). If the wireless performance parameter significantly decreases, deteriorates or is lower than levels of other radio frequency communication devices, it is determined that the radio frequency communication device currently experiences interference, and the radio frequency interference information is generated. A sensitive parameter can be found by adjusting the state parameters A, B, C, and D respectively and monitoring the change of the wireless performance parameter. If the adjustment of the parameter A has a great impact on the change of the wireless performance parameter, for example, the correlation coefficient is 1, it indicates that the parameter A is a sensitive parameter. If the adjustment of the parameter B has a great impact on the change of the wireless performance parameter, for example, the correlation coefficient is 0.8, it indicates that the parameter B is a sensitive parameter. If the adjustment of the parameter C has a moderate impact on the change of the wireless performance parameter, for example, the correlation coefficient is 0.5, it indicates that the sensitivity of the parameter C is half that of the parameter A. If the adjustment of the parameter D has a slight impact on the change of the wireless performance parameter, for example, the correlation coefficient is 0.1, it indicates that the parameter A is a non-sensitive parameter. A correlation coefficient threshold corresponding to the state parameter to be adjusted may be set, for example, to 0.6. If the correlation coefficient is greater than or equal to 0.6, e.g., for the state parameters A and B, the state parameters A and B need to be adjusted, to adjust the radio frequency power supply status and reduce the radio frequency interference.

In some embodiments, different state parameters of the radio frequency power supply status (radio frequency power supply mode and/or radio frequency power supply parameter and/or power source concurrent interference suppression coexistence parameter) may be mapped to different calibration parameters, and different radio frequency power supply statuses may be mapped to different calibration parameter sets (or calibration parameter tables). The calibration parameters may be stored by the parameter storage module. For example, different calibration nonvolatile (NV) parameter values may be generated for different calibration parameters corresponding to different radio frequency power supply statuses, and the NV parameter values of the terminal may be stored as a *.qcn file in the parameter storage module for searching or calling.

Figure 6:
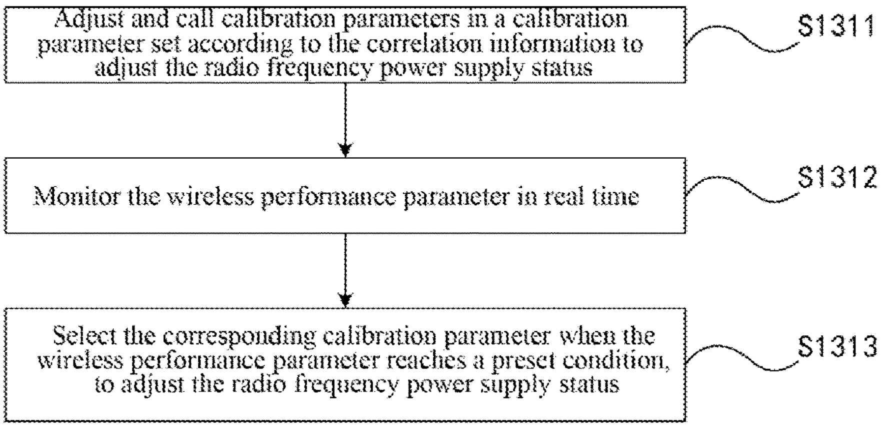
FIG. 6 is a schematic flowchart of a radio frequency power supply adjustment method according to another embodiment of the present disclosure.

In some embodiments, referring to FIG. 6, adjusting the radio frequency power supply status according to the correlation information in S1300 includes the following steps S1311 to S1313.

At S1311, calibration parameters in a calibration parameter set are adjusted and called according to the correlation information to adjust the radio frequency power supply status, where the calibration parameter set is generated from different radio frequency power supply statuses through calibration mapping.

At S1312, the wireless performance parameter is monitored in real time.

At S1313, the corresponding calibration parameter when the wireless performance parameter reaches a preset condition is selected, to adjust the radio frequency power supply status.

In some embodiments, in S1311, when radio frequency interference occurs, it can be determined according to the correlation information whether the radio frequency interference is related to the radio frequency power supply status. If yes, the radio frequency power supply status can be adjusted by adjusting the calibration parameters in the calibration parameter set. This can ensure that the radio frequency power supply status can be switched without restarting the radio frequency communication device, and the radio frequency power supply status switched to takes effect in real time. Then, S1312 is performed to monitor the wireless performance parameter in real time through a closed-loop detection mechanism. Then, S1313 is performed until an optimal radio frequency power supply status configuration is selected for interference-free or low-interference communication.

In some embodiments, in S1311, when radio frequency interference occurs, it can be determined according to the correlation information whether the radio frequency interference is related to the radio frequency power supply status. If yes, the radio frequency power supply status can be adjusted by calling the calibration parameters in each calibration parameter set by rotation. Then, S1312 is performed to monitor the wireless performance parameter in real time through a closed-loop detection mechanism. Then, S1313 is performed until a calibration parameter set corresponding to an optimal radio frequency power supply status is selected for interference-free or low-interference communication.

In some embodiments, adjusting the radio frequency power supply status according to the correlation information in S1300 includes a following step S1321.

At S1321, a calibration parameter set is called according to the correlation information and a preset relationship mapping table, to adjust the radio frequency power supply status, where the calibration parameter set is generated from different radio frequency power supply statuses through calibration mapping, and the relationship mapping table includes a correspondence between the correlation information and the calibration parameter set.

In some embodiments, the correlation information includes a correlation coefficient. A correspondence between correlation coefficients and calibration parameter sets may be pre-stored as the preset relationship mapping table, i.e., different correlation coefficients correspond to different calibration parameter sets. When radio frequency interference occurs, it can be determined according to the correlation information whether the radio frequency interference is related to the radio frequency power supply status, and the corresponding correlation coefficient can be determined. By querying the preset relationship mapping table, that is, by querying the correspondence between correlation coefficients and calibration parameter sets, the corresponding calibration parameter set can be directly called according to the correlation coefficient for interference-free or low-interference communication.

Figure 7:
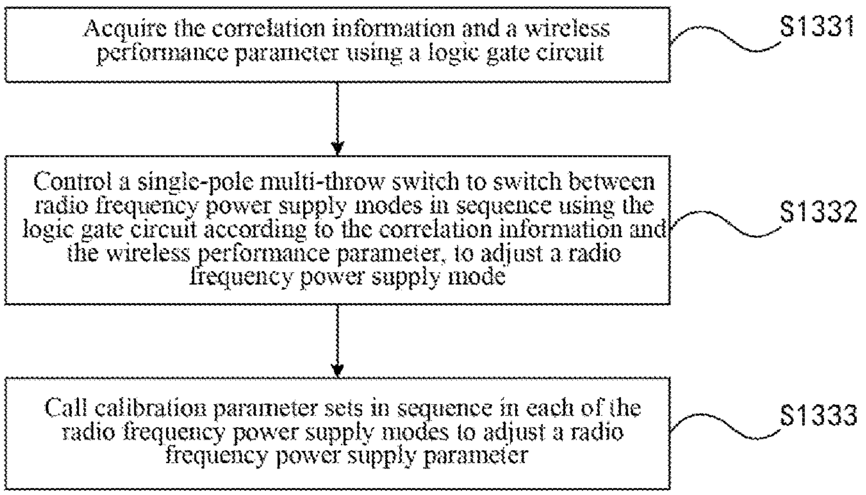
FIG. 7 is a schematic flowchart of a radio frequency power supply adjustment method according to another embodiment of the present disclosure.

In some embodiments, referring to FIG. 7, adjusting the radio frequency power supply status according to the correlation information in S1300 includes the following steps S1331 to S1333.

At S1331, the correlation information and a wireless performance parameter are acquired using a logic gate circuit.

At S1332, a single-pole multi-throw switch is controlled to switch between radio frequency power supply modes in sequence by utilizing a logic gate circuit according to the correlation information and the wireless performance parameter, to adjust a radio frequency power supply mode.

At S1333, calibration parameter sets are called in sequence in each of the radio frequency power supply modes to adjust a radio frequency power supply parameter.

In some embodiments, the radio frequency power supply status includes a radio frequency power supply mode, which can be adjusted by utilizing a radio frequency power supply mode switching module. When detecting that interference from a power source exists, a control system detects a current operating power range of the radio frequency communication device, checks a current radio frequency power supply status of the PA, and determines a current gain level of the PA. The control system determines whether the current radio frequency power supply mode is Bypass, APT, EPT, ET, or other power supply modes according to the current gain level. By performing S1331, S1332 and S1333, the correlation information is acquired using the logic gate circuit; if it is determined according to the correlation information that the current interference is caused by the radio frequency power supply mode, the power supply mode switching module is enabled to change the current radio frequency power supply mode. By utilizing the power supply mode switching module to control the power supply of the PA in the radio frequency communication device, hardware and software switching can be performed. The hardware switching mode may realize the switching of the radio frequency power supply mode by utilizing a logic gate circuit to control a single-pole multi-throw switch. For example, referring to FIG. 8, a logic gate circuit may be used to control a single-pole four-throw switch SP4T to realize the switching of the radio frequency power supply mode, i.e., to realize the switching among the four modes of the PA power source: Bypass, APT, EPT, and ET. Then, by performing S1331, S1332 and S1333, the wireless performance parameter is acquired and monitored in real time, and the single-pole multi-throw switch is controlled according to the change of the wireless performance parameter to realize adaptive real-time switching among multiple modes. For example, an input enable of the logic gate circuit may be designed as a correlation information item "pass" or "fail" of a radio frequency self-test program of the radio frequency communication device. For example, "pass" is 0 and "fail" is 1. In other words, the logic gate circuit is enabled according to the correlation information. A wireless interference test program obtains a wireless performance parameter item such as BLER and SNR through testing, and compares BLER and SNR with thresholds. For example, BLER<5% is 0, and BLER>5% is 1. When an input of the logic gate is 1, it indicates that there is interference. In this case, the single-pole four-throw switch is controlled to perform scanning and switching of the radio frequency power supply modes, to call the calibration parameters corresponding to each of the radio frequency power supply modes in sequence until the radio frequency indicator and the wireless network performance meet requirements.

Figure 8:
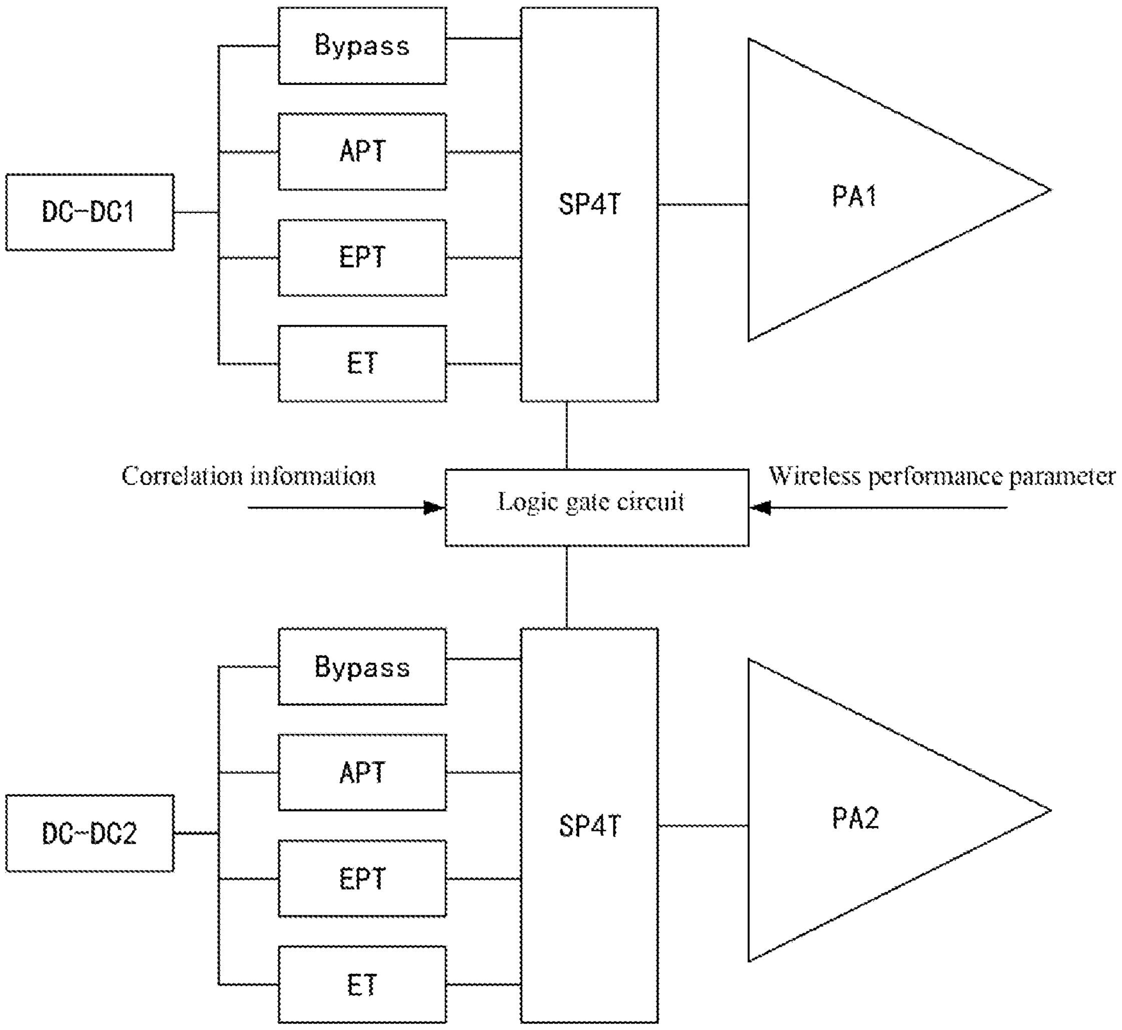
FIG. 8 is a schematic partial structural diagram of a radio frequency power supply adjustment apparatus according to an embodiment of the present disclosure.

In some embodiments, referring to FIG. 8, the radio frequency communication device includes at least a 5G radio frequency module and a 4G radio frequency module. Power supply of the 5G radio frequency module and the 4G radio frequency module is relatively independent, i.e., two sets of DC-DC power sources (DC-DC1 and DC-DC2) are required. A logic gate circuit may be used to control two single-pole four-throw switches SP4T to supply power to PA chips (PA1 and PA2) to realize the switching of the radio frequency power supply mode, i.e., to realize the switching among the four modes of the PA power source: Bypass, APT, EPT, and ET.

Compared with the manner that the radio frequency power supply mode is fixed or is only affected by power (for example, the APT mode is used when the power is below 15 dB, the EPT mode is used when the power ranges from 15 dB to 19 dB, and the ET mode is used when the power is above 19 dB), the radio frequency power supply mode switching provided by the embodiments of the present disclosure is more flexible and accurate. The power supply mode can be flexibly switched in the case of interference by the power source or deterioration of other wireless performance parameters caused by the power source, thereby optimizing the wireless communication performance.

In some embodiments, the radio frequency power supply status includes a radio frequency power supply parameter, which can be adjusted by utilizing a radio frequency power supply parameter adjustment module. The radio frequency power supply parameter includes at least one of a power supply voltage, a Radio frequency Gain Index (RGI) value, ICQ, an RGI range, a compression point, a Vmin value, or a Vmax value, etc. In some embodiments, if the radio frequency power supply mode is the APT mode, the radio frequency power supply parameters include a peak voltage, a real-time voltage, an RGI value, and an ICQ value; and if the radio frequency power supply mode is the EPT or ET mode, the radio frequency power supply parameters include the power supply voltage, the RGI value, the ICQ, the RGI range, the compression point, the Vmin value, and the Vmax value. In an embodiment, different NV parameter values can be generated for different calibration parameters corresponding (mapped) to different radio frequency power supply parameters, and stored in the parameter storage module. Calibration parameters are also mapped to wireless configuration parameters, such as bandwidth, RB number, NR waveform, MCS modulation mode, etc., for power supply mapping of different wireless configuration parameters.

In some embodiments, it can be determined according to the correlation information whether the radio frequency interference is related to the radio frequency power supply status. If yes, the radio frequency power supply status can be adjusted by adjusting the calibration parameters in the calibration parameter set. This can ensure that the radio frequency power supply status can be switched without restarting the radio frequency communication device, and the radio frequency power supply status switched to takes effect in real time. Then, the wireless performance parameter is monitored in real time through a closed-loop detection mechanism, until an optimal radio frequency power supply status configuration is selected for interference-free or low-interference communication.

In some embodiments, the radio frequency power supply status includes a power source concurrent interference suppression coexistence parameter, which may be adjusted using a power source concurrent interference suppression module. The power source concurrent interference suppression coexistence parameter includes at least one of a coexistence power control parameter, a coexistence bandwidth limit parameter, a coexistence power source power supply mode matching parameter, a coexistence power source parameter matching parameter, a coexistence PA operating mode parameter, or a coexistence isolation improvement parameter, etc.

In some embodiments, the power source concurrent interference suppression module controls the power source concurrent interference suppression coexistence parameters of at least two power conversion chips to enter different radio frequency power supply statuses, and calls different power source calibration parameters to match the radio frequency power supply status with the current bandwidth, power, wireless performance indicator, and throughput requirements. The coexistence power control parameter is used to define a value of a transmit power of each radio frequency module in the concurrent mode (multi-radio frequency module concurrent mode) (for example, any power value ranging from −30 dB to 28 dB). The coexistence bandwidth limit parameter is used to define a value of transmission bandwidth of each radio frequency module in the concurrent mode (for example, 20 M, 40 M, 60 M, 80 M, or 100 M). The coexistence power source parameter matching parameter is used to define the radio frequency power supply mode of each radio frequency module in the concurrent mode (for example, ET, EPT, APT, or BYPASS). The coexistence power source parameter matching parameter is used to define the radio frequency power supply parameter (such as Vmax value, Vmin value, compression point, or ICQ) of each radio frequency module in the concurrent mode. The coexistence PA operating mode parameter is used to define a PA operating mode (such as PA gain level, cutoff point, etc.) of each radio frequency module in the concurrent mode. The coexistence isolation improvement parameter is used to define a degree of isolation between radio frequency modules in the concurrent mode. It should be noted that the above parameters may include multiple subset parameters. By adjusting and calling the above parameters and parameter subset parameters, interference in the concurrent mode is suppressed until the throughput performance and other wireless performance parameters of the user are improved to meet a threshold target.

The following only takes the coexistence isolation improvement parameter and the coexistence bandwidth limit parameter as examples to illustrate the adjustment method of the power source concurrent interference suppression coexistence parameter.

First, taking the coexistence isolation improvement parameter as an example, when it is detected that a current uplink throughput decline is caused by the concurrent mode, the power supply correlation coefficient calculation module performs S1200 to determine that the power supply of the two power sources has an impact. This impact is related to the degree of isolation between the two power sources. In this way, it can be determined that the current performance deterioration is caused by the isolation coefficient. In this case, the coexistence isolation improvement parameter can be adjusted to increase the degree of isolation between DC-DC power sources of two radio frequency modules or DC-DC power sources of multiple radio frequency modules. Factors affecting the degree of isolation between power sources are strongly related to the layout of DC-DC power sources, the magnitude of power supply current, grounding performance and power source filtering performance. In this case, an isolation adjustment circuit on the two DC-DC power sources is used to, for example, adjust a grounding environment around a power source chip, adjust the magnitude of the power filter capacitance, adjust the magnitude of the inductance of a BUCK circuit (buck converter circuit), and adjust the magnitude of the load capacitance in the APT or ET mode, to perform comprehensive coexistence isolation optimization and adjustment until the isolation performance meets the current requirements of power source coexistence.

Then, taking the coexistence bandwidth limit parameter as an example, if it is found that the current deterioration of the wireless performance parameter (e.g., the uplink throughput decreases or the bit error rate increases) is caused by the concurrent operation of two 5G NR radio frequency modules TX1 and TX2, and the two 5G NR radio frequency modules TX1 and TX2 are both at 100 M bandwidth, the power supply correlation coefficient calculation module performs calculation in S1200. If the NR TX2 is at 60 M bandwidth, the EVM indicator during the concurrent operation of the two 5G NR radio frequency modules TX1 and TX2 is significantly improved, and the corresponding throughput also increases significantly. In this case, the coexistence bandwidth limit parameter is adjusted to limit the operating bandwidth of the two 5G NR radio frequency modules, and the radio frequency power supply parameter under the corresponding bandwidth is adjusted to match the radio frequency power supply parameter with the current bandwidth, until the configuration of the coexistence bandwidth limit parameter meets the current requirements of power source coexistence.

In some embodiments, the power source concurrent interference suppression coexistence parameter may also be adjusted according to a preset radio frequency module priority. For example, in the 5G-prior mode, the power source concurrent interference suppression coexistence parameter may be adjusted to give priority to the 5G NR radio frequency module.

Through the design of the radio frequency power supply modes in the embodiments of the present disclosure, the radio frequency power supply status can be switched adaptively according to scenario requirements, to realize the flexible adjustment of the radio frequency power supply status, thereby effectively improving the anti-interference ability of the radio frequency communication device and improving the communication performance of the radio frequency communication device.

In accordance with a second aspect of the present disclosure, an embodiment provides a radio frequency power supply adjustment apparatus. The apparatus includes: an acquisition module, a correlation information determination module, and a power supply status adjustment module.

The acquisition module is configured for acquiring radio frequency interference information.

The correlation information determination module is configured for determining, according to the radio frequency interference information, correlation information between the radio frequency interference information and a radio frequency power supply status.

The power supply status adjustment module is configured for adjusting the radio frequency power supply status according to the correlation information.

In some embodiments, in the radio frequency power supply adjustment apparatus, the acquisition module, the correlation information determination module, and the power supply status adjustment module are connected in sequence.

Figure 9:
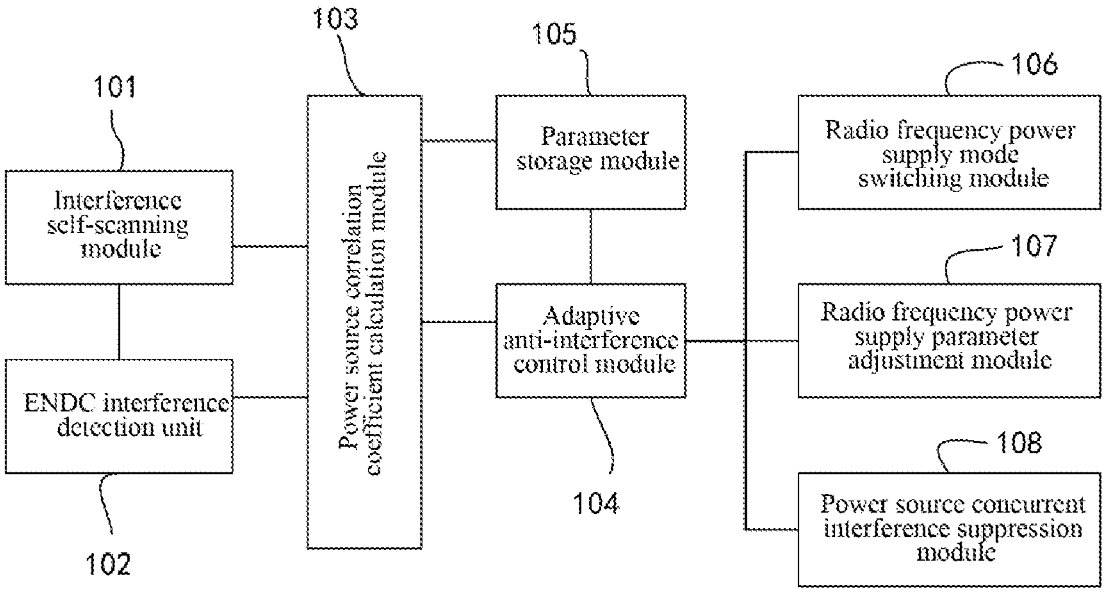
FIG. 9 is a schematic partial structural diagram of a radio frequency power supply adjustment apparatus according to another embodiment of the present disclosure.

Referring to FIG. 9, in some embodiments, the acquisition module includes an interference self-scanning module. The interference self-scanning module may be configured for scanning channel interference and non-channel interference, and may also be configured for scanning channel interference under different radio frequency power supply statuses.

The interference self-scanning module is connected to an antenna unit and a radio frequency transceiver that are built in the mobile phone, and is configured for detection of self-transmitting self-receiving interference of a radio frequency signal, that is, self-transmitting self-receiving processing of signals of path interference test units of radio frequency. For example, for a mobile phone with a 4G LTE radio frequency module and a 5G NR radio frequency module, changes in the RSRP value and the SNR value of two frequency bands in a coexistence state may be detected based on a self-transmitting self-receiving E-UTRA-NR Dual Connectivity (ENDC) harmonic detection algorithm of the mobile phone, and compared with the preset wireless performance parameters to determine whether ENDC interference occurs. A self-transmitting self-receiving harmonic and intermodulation interference algorithm may not require the use of a third-party instrument. A radio frequency chip is used to input a certain signal level or transmit power, e.g., a maximum transmit power of −85 dB and 23 dB, in a corresponding frequency band, frequency channel number or channel, bandwidth and other wireless setting parameters (such as resource block (RB) number, slot number, modulation mode, multi-stream rank number, etc.) in 4G LTE. Then, a radio frequency chip is used to input a certain signal level or transmit power, e.g., −85 dB, in a corresponding frequency band, frequency channel number or channel, bandwidth and other wireless configuration information (such as resource block (RB) number, slot number, modulation mode, multi-stream rank number, etc.) in 5G NR. In addition, 4G LTE is set as a transmitting interference path and NR is set as a receiving interference path. An NR signal level, e.g., −87 dB, received by a receiving and scanning terminal is compared with a preset wireless performance parameter (e.g., a reference RSRP value of −85 dB), it can be seen that there is currently 2 dB harmonic interference. In addition, if 5G NR is a signal transmitting end (transmitting interference path), and 4G LTE is a signal receiving end (receiving interference path), a 4G LTE signal level, e.g., −90 dB, received by the receiving and scanning terminal is compared with a preset wireless performance parameter (e.g., a reference RSRP value of −85 dB), and it can be seen that there is currently 5 dB intermodulation interference.

In some embodiments, the interference self-scanning module is further configured for self-transmitting and self-testing of the EVM and ACLR indicators of the terminal, using a radio frequency test program built in the terminal to control the terminal to carry out modulation and demodulation tests, and performing self-transmitting self-receiving collection of a tested value such as EVM, ACLR or sensitivity without the use of an instrument. The collected value is used for the judgment and feedback of radio frequency power supply interference.

In some other embodiments, the acquisition module further includes an ENDC interference detection unit. The ENDC interference detection unit may be used to determine whether ENDC interference exists, and generate the radio frequency interference information. For example, the ENDC interference detection unit may be connected to the interference self-scanning module and configured for acquiring a current ENDC interference status of the terminal. When the radio frequency communication device operates in the ENDC state, the detection unit first detects whether there is interference, and detects a standard and frequency band combination that causes the interference. For example, it is determined by detection the type of the interference, for example, interference from the B3 band of 4G LTE and the N78 band of 5G NR, interference from the B41 band of 4G LTE and the N41 band of 5G NR, interference from WIFI and the N79 band of 5G NR, interference from MMW and GPS, etc. The ENDC interference from 4G LTE and 5G NR can be detected and determined through the detection of self-transmitting self-receiving interference of the radio frequency signal. Other standard and frequency band combinations that cause the interference may also be detected and determined by a similar method, and the details will not be repeated herein again. When detecting a deterioration of performance using the interference self-scanning module (e.g., by comparing the detected wireless performance parameter with a preset wireless performance parameter), the radio frequency communication device randomly activates the ENDC interference detection unit to detect whether there is interference in the current radio frequency communication device status and basic wireless configuration information (such as RB number, slot number, modulation mode, multi-stream rank number, etc.) that causes the interference, and determines whether there is ENDC interference by comparing the wireless performance parameter with the preset wireless performance parameter. If the wireless performance parameter significantly decreases, deteriorates or is lower than levels of other radio frequency communication devices, it indicates that there is ENDC interference, and the radio frequency interference information corresponding to the ENDC interference is generated. It should be noted that the ENDC interference is only an example, and radio frequency power supply interference may not only exist in a non-standalone (NSA) mode, but also exist in a standalone (SA) mode.

In some embodiments, the correlation information determination module includes the power supply correlation coefficient calculation module. The power source correlation coefficient calculation module can be used to calculate the correlation coefficient between the radio frequency interference information and the radio frequency power supply status, and can also be used to determine whether the radio frequency interference is caused by the PA power source and whether it is necessary to start a power supply anti-interference control program to control the radio frequency power supply status.

In some embodiments, when receiving the radio frequency interference information and determining that the radio frequency communication device currently experiences interference, the power source correlation coefficient calculation module collects wireless performance parameters obtained through testing by the interference self-scanning module under different radio frequency power supply modes and radio frequency power supply parameters, and determines whether the current interference is related to a power source. For example, if a wireless performance parameter such as uplink/downlink throughput, SNR or RSRP collected by the radio frequency communication device under a current default radio frequency power supply mode and radio frequency power supply parameter is abnormal or exceeds a default value (preset wireless performance parameter) stored in a parameter storage module by a certain threshold, it indicates that interference exists in the current operating mode of the terminal. If the wireless performance parameter significantly changes with different power supply modes and power supply parameters, it indicates that there is a correlation. The value of the correlation is stored as a correlation coefficient in the parameter storage module. In some embodiments, a higher correlation between the radio frequency interference information and the radio frequency power supply status indicates a larger correlation coefficient. The relationship between the correlation and the corresponding correlation coefficient may be set according to actual needs. For example, the radio frequency power supply status includes four state parameters A, B, C, and D (where the state parameters correspond to specific radio frequency power supply modes, and may also correspond to specific radio frequency power supply parameters). If the wireless performance parameter significantly decreases, deteriorates or is lower than levels of other radio frequency communication devices, it is determined that the radio frequency communication device currently experiences interference, and the radio frequency interference information is generated. A sensitive parameter can be found by adjusting the state parameters A, B, C, and D respectively and monitoring the change of the wireless performance parameter. If the adjustment of the parameter A has a great impact on the change of the wireless performance parameter, for example, the correlation coefficient is 1, it indicates that the parameter A is a sensitive parameter. If the adjustment of the parameter B has a great impact on the change of the wireless performance parameter, for example, the correlation coefficient is 0.8, it indicates that the parameter B is a sensitive parameter. If the adjustment of the parameter C has a moderate impact on the change of the wireless performance parameter, for example, the correlation coefficient is 0.5, it indicates that the sensitivity of the parameter C is half that of the parameter A. If the adjustment of the parameter D has a slight impact on the change of the wireless performance parameter, for example, the correlation coefficient is 0.1, it indicates that the parameter A is a non-sensitive parameter. A correlation coefficient threshold corresponding to the state parameter to be adjusted may be set, for example, to 0.6. If the correlation coefficient is greater than or equal to 0.6, e.g., for the state parameters A and B, the state parameters A and B need to be adjusted, to adjust the radio frequency power supply status and reduce the radio frequency interference.

In some embodiments, the radio frequency power supply adjustment apparatus further includes a parameter storage module, which is respectively connected to the power source correlation coefficient calculation module and an adaptive anti-interference control module, and is configured to store wireless performance parameters, radio frequency power supply parameters, calibration parameters, etc. These parameter values may further be combined according to the current network environment and ENDC, and stored as a new parameter model according to new ENDC configuration and data obtained through testing, for subsequent reference and calling.

In some embodiments, the power supply status adjustment module includes the adaptive anti-interference control module. The adaptive anti-interference control module is connected to the power source correlation coefficient calculation module, and is configured to receive a correlation coefficient from the power source correlation coefficient calculation module and output a control signal to adaptively adjust and control the radio frequency power supply status. The adaptive anti-interference control module may include an interference comparison function, which first collects and compares the current wireless performance parameters. For example, signal strengths without ENDC interference are collected. For example, a signal strength of a single 4G LTE radio frequency module or a single 5G NR radio frequency module is respectively collected as a reference value, and then a signal strength value in the concurrent mode ENDC is collected. The signal strength value is compared with the reference value. If the signal strength in the concurrent mode ENDC becomes poor, an optimal adjustment method is adaptively pushed according to a current wireless service, and a control signal is outputted to adaptively adjust and control the radio frequency power supply status. If the current adjusted signal strength is already optimal, adjustment or feedback will not be prompted. Similarly, if the current data transmission throughput is detected to be abnormal, the current data transmission throughput is compared with a wireless signal reference value (preset wireless performance parameter). If the current data transmission throughput is lower than the reference value, it can be determined through comparison that the current wireless performance is reduced, and a control signal is outputted to adaptively adjust and control the radio frequency power supply status. For a cellular radio frequency module, a WI-FI radio frequency module or a GPS radio frequency module, if it is detected that there is obvious stalling reported in a call service, it can also be determined through comparison whether the wireless performance parameter under the current ENDC decreases, so as to adaptively adjust the radio frequency power supply status. Through a built-in algorithm of the system, the correlation between the power source system and the change of throughput and other signal quality parameters before and after the switching of the radio frequency power supply mode and the change of the power supply parameter is analyzed through comparison, and the radio frequency power supply status is adjusted to a radio frequency power supply configuration with higher signal quality, higher throughput and more stable rate.

In some embodiments, the power supply status adjustment module further includes a radio frequency power supply mode switching module, a radio frequency power supply parameter adjustment module, and a power source concurrent interference suppression module. The radio frequency power supply mode switching module, the radio frequency power supply parameter adjustment module, and the power source concurrent interference suppression module are all connected to the adaptive anti-interference control module.

In some embodiments, the radio frequency power supply mode may be adjusted by utilizing the radio frequency power supply mode switching module. The radio frequency power supply mode switching module is connected to the adaptive anti-interference control module and is configured to adjust the radio frequency power supply mode according to the control signal of the adaptive anti-interference control module.

In some embodiments, the power supply status adjustment module includes: a logic gate circuit, a single-pole multi-throw switch, and a parameter adjustment module.

The logic gate circuit is configured for acquiring the correlation information and a wireless performance parameter, and outputting a control signal according to the correlation information and the wireless performance parameter.

The single-pole multi-throw switch is connected to the logic gate circuit and configured for switching between radio frequency power supply modes according to the control signal.

The parameter adjustment module is configured for calling calibration parameter sets in sequence in each of the radio frequency power supply modes to adjust a radio frequency power supply parameter.

In some embodiments, when detecting that interference from a power source exists, a control system detects a current operating power range of the radio frequency communication device, checks a current radio frequency power supply status of the PA, and determines a current gain level of the PA. The control system determines whether the current radio frequency power supply mode is Bypass, APT, EPT, ET, or other power supply modes according to the current gain level. By performing the method described in S1331, S1332 and S1333, the correlation information is acquired using the logic gate circuit; if it is determined according to the correlation information that the current interference is caused by the radio frequency power supply mode, the power supply mode switching module is enabled to change the current radio frequency power supply mode. By utilizing the power supply mode switching module to control the power supply of the PA in the radio frequency communication device, hardware and software switching can be performed. The hardware switching mode may realize the switching of the radio frequency power supply mode by utilizing a logic gate circuit to control a single-pole multi-throw switch. For example, referring to FIG. 8, a logic gate circuit may be used to control a single-pole four-throw switch SP4T to realize the switching of the radio frequency power supply mode, i.e., to realize the switching among the four modes of the PA power source: Bypass, APT, EPT, and ET. Then, by performing S1331, S1332 and S1333, the wireless performance parameter is acquired and monitored in real time, and the single-pole multi-throw switch is controlled according to the change of the wireless performance parameter to realize adaptive real-time switching among multiple modes. For example, an input enable of the logic gate circuit may be designed as a correlation information item "pass" or "fail" of a radio frequency self-test program of the radio frequency communication device. For example, "pass" is 0 and "fail" is 1. In other words, the logic gate circuit is enabled according to the correlation information. A wireless interference test program obtains a wireless performance parameter item such as BLER and SNR through testing, and compares BLER and SNR with thresholds. For example, BLER<5% is 0, and BLER>5% is 1. When an input of the logic gate is 1, it indicates that there is interference. In this case, the single-pole four-throw switch is controlled to perform scanning and switching of the radio frequency power supply modes, to call the calibration parameters corresponding to each of the radio frequency power supply modes in sequence until the radio frequency indicator and the wireless network performance meet requirements.

In some embodiments, referring to FIG. 8, the radio frequency communication device includes at least a 5G radio frequency module and a 4G radio frequency module. Power supply of the 5G radio frequency module and the 4G radio frequency module is relatively independent, i.e., two sets of power sources DC-DC (DC-DC1 and DC-DC2) are required. A logic gate circuit may be used to control two single-pole four-throw switches SP4T to supply power to PA chips (PA1 and PA2) to realize the switching of the radio frequency power supply mode, i.e., to realize the switching among the four modes of the PA power source: Bypass, APT, EPT, and ET.

Compared with the manner that the radio frequency power supply mode is fixed or is only affected by power (for example, the APT mode is used when the power is below 15 dB, the EPT mode is used when the power ranges from 15 dB to 19 dB, and the ET mode is used when the power is above 19 dB), the radio frequency power supply mode switching provided by the embodiments of the present disclosure is more flexible and accurate. The power supply mode can be flexibly switched in the case of interference by the power source or deterioration of other wireless performance parameters caused by the power source, thereby optimizing the wireless communication performance.

In some embodiments, the radio frequency power supply parameter can be adjusted by utilizing a radio frequency power supply parameter adjustment module. The radio frequency power supply parameter adjustment module is connected to the adaptive anti-interference control module and is configured to adjust the radio frequency power supply parameter according to the control signal of the adaptive anti-interference control module. The radio frequency power supply parameter includes at least one of a power supply voltage, a Radio frequency Gain Index (RGI) value, ICQ, an RGI range, a compression point, a Vmin value, a Vmax value, etc. In some embodiments, if the radio frequency power supply mode is the APT mode, the radio frequency power supply parameters include a peak voltage, a real-time voltage, an RGI value, and an ICQ value; and if the radio frequency power supply mode is the EPT or ET mode, the radio frequency power supply parameters include the power supply voltage, the RGI value, the ICQ, the RGI range, the compression point, the Vmin value, and the Vmax value. In an embodiment, different NV parameter values can be generated for different calibration parameters corresponding (mapped) to different radio frequency power supply parameters, and stored in the parameter storage module. Calibration parameters are also mapped to wireless configuration parameters, such as bandwidth, RB number, NR waveform, MCS modulation mode, etc., for power supply mapping of different wireless configuration parameters.

In some embodiments, it can be determined according to the correlation information whether the radio frequency interference is related to the radio frequency power supply status. If yes, the radio frequency power supply status can be adjusted by adjusting the calibration parameters in the calibration parameter set. This can ensure that the radio frequency power supply status can be switched without restarting the radio frequency communication device, and the radio frequency power supply status switched to takes effect in real time. Then, the wireless performance parameter is monitored in real time through a closed-loop detection mechanism, until an optimal radio frequency power supply status configuration is selected for interference-free or low-interference communication.

In some embodiments, the power source concurrent interference suppression coexistence parameter can be adjusted by utilizing a power source concurrent interference suppression module. The power source concurrent interference suppression module is connected to the adaptive anti-interference control module to adjust the power source concurrent interference suppression coexistence parameter according to the control signal of the adaptive anti-interference control module. The power source concurrent interference suppression coexistence parameter includes at least one of a coexistence power control parameter, a coexistence bandwidth limit parameter, a coexistence power source power supply mode matching parameter, a coexistence power source parameter matching parameter, a coexistence PA operating mode parameter, or a coexistence isolation improvement parameter, etc.

In some embodiments, the power source concurrent interference suppression module controls the power source concurrent interference suppression coexistence parameters of at least two power conversion chips to enter different radio frequency power supply statuses, and calls different power source calibration parameters to match the radio frequency power supply status with the current bandwidth, power, wireless performance indicator, and throughput requirements. The coexistence power control parameter is used to define a value of a transmit power of each radio frequency module in the concurrent mode (multi-radio frequency module concurrent mode) (for example, any power value ranging from −30 dB to 28 dB). The coexistence bandwidth limit parameter is used to define a value of transmission bandwidth of each radio frequency module in the concurrent mode (for example, 20 M, 40 M, 60 M, 80 M, or 100 M). The coexistence power source parameter matching parameter is used to define the radio frequency power supply mode of each radio frequency module in the concurrent mode (for example, ET, EPT, APT, or BYPASS). The coexistence power source parameter matching parameter is used to define the radio frequency power supply parameter (such as Vmax value, Vmin value, compression point, or ICQ) of each radio frequency module in the concurrent mode. The coexistence PA operating mode parameter is used to define a PA operating mode (such as PA gain level, cutoff point, etc.) of each radio frequency module in the concurrent mode. The coexistence isolation improvement parameter is used to define a degree of isolation between radio frequency modules in the concurrent mode. It should be noted that the above parameters may include multiple subset parameters. By adjusting and calling the above parameters and parameter subset parameters, interference in the concurrent mode is suppressed until the throughput performance and other wireless performance parameters of the user are improved to meet a threshold target.

The following only takes the coexistence isolation improvement parameter and the coexistence bandwidth limit parameter as examples to illustrate the adjustment method of the power source concurrent interference suppression coexistence parameter.

First, taking the coexistence isolation improvement parameter as an example, when it is detected that a current uplink throughput decline is caused by the concurrent mode, the power supply correlation coefficient calculation module performs S1200 to determine that the power supply of the two power sources has an impact. This impact is related to the degree of isolation between the two power sources. In this way, it can be determined that the current performance deterioration is caused by the isolation coefficient. In this case, the coexistence isolation improvement parameter can be adjusted to increase the degree of isolation between DC-DC power sources of two radio frequency modules or DC-DC power sources of multiple radio frequency modules. Factors affecting the degree of isolation between power sources are strongly related to the layout of DC-DC power sources, the magnitude of power supply current, grounding performance and power source filtering performance. In this case, an isolation adjustment circuit on the two DC-DC power sources is used to, for example, adjust a grounding environment around a power source chip, adjust the magnitude of the power filter capacitance, adjust the magnitude of the inductance of a BUCK circuit (buck converter circuit), and adjust the magnitude of the load capacitance in the APT or ET mode, to perform comprehensive coexistence isolation optimization and adjustment until the isolation performance meets the current requirements of power source coexistence.

Then, taking the coexistence bandwidth limit parameter as an example, if it is found that the current deterioration of the wireless performance parameter (e.g., the uplink throughput decreases or the bit error rate increases) is caused by the concurrent operation of two 5G NR radio frequency modules TX1 and TX2, and the two 5G NR radio frequency modules TX1 and TX2 are both at 100 M bandwidth, the power supply correlation coefficient calculation module performs calculation in S1200. If the NR TX2 is at 60 M bandwidth, the EVM indicator during the concurrent operation of the two 5G NR radio frequency modules TX1 and TX2 is significantly improved, and the corresponding throughput also increases significantly. In this case, the coexistence bandwidth limit parameter is adjusted to limit the operating bandwidth of the two 5G NR radio frequency modules, and the radio frequency power supply parameter under the corresponding bandwidth is adjusted to match the radio frequency power supply parameter with the current bandwidth, until the configuration of the coexistence bandwidth limit parameter meets the current requirements of power source coexistence.

Through the design of the radio frequency power supply modes in the embodiments of the present disclosure, the radio frequency power supply status can be switched adaptively according to scenario requirements, to realize the flexible adjustment of the radio frequency power supply status, thereby effectively improving the anti-interference ability of the radio frequency communication device and improving the communication performance of the radio frequency communication device.

In accordance with a third aspect of the present disclosure, an embodiment provides an electronic device. The device includes: a memory, a processor, and a computer program stored in the memory and executable by the processor which, when executed by the processor, causes the processor to perform the radio frequency power supply adjustment method in accordance with any embodiment of the first aspect.

In some embodiments, the electronic device may be a terminal, a network device, etc. The terminal may be a mobile terminal device or a non-mobile terminal device. The mobile terminal device may be a mobile phone, a tablet computer, a notebook computer, a handheld computer, a vehicle-mounted terminal device, a wearable device, an ultra-mobile personal computer, a netbook, a personal digital assistant, a CPE, or a UFI (wireless hotspot device), etc. The non-mobile terminal device may be a personal computer, a television, a teller machine, or a self-service machine, etc. The network device may be a device configured for communicating with a terminal device. The network device may include a base station, a repeater or other network side device with similar functions.

In accordance with a fourth aspect of the present disclosure, an embodiment provides a computer-readable storage medium, storing a computer-executable instruction for performing the radio frequency power supply adjustment method in accordance with any embodiment of the first aspect.

An embodiment of the present disclosure includes: acquiring radio frequency interference information; determining, according to the radio frequency interference information, correlation information between the radio frequency interference information and a radio frequency power supply status; and adjusting the radio frequency power supply status according to the correlation information. Through the design of the radio frequency power supply modes in the embodiments of the present disclosure, the radio frequency power supply status can be switched adaptively according to scenario requirements, to realize the flexible adjustment of the radio frequency power supply status, thereby effectively improving the anti-interference ability of the radio frequency communication device.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but is not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information passing medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A radio frequency power supply adjustment method, comprising:

acquiring radio frequency interference information;

determining, according to the radio frequency interference information, correlation information between the radio frequency interference information and a radio frequency power supply status; and adjusting the radio frequency power supply status according to the correlation information;

wherein the correlation information comprises a correlation coefficient; and determining, according to the radio frequency interference information, correlation information between the radio frequency interference information and a radio frequency power supply status comprises:

testing a change of a wireless performance parameter under different radio frequency power supply statuses according to the radio frequency interference information; and determining a correlation coefficient between the radio frequency interference information and the radio frequency power supply statuses according to the change.

2. The method of claim 1, wherein the radio frequency power supply status comprises at least one of a radio frequency power supply mode, a radio frequency power supply parameter, or a power source concurrent interference suppression coexistence parameter.

3. The method of claim 2, wherein:

the radio frequency power supply mode comprises a Bypass mode, an Average Power Tracking (APT) mode, an Enhanced Power Tracking (EPT) mode, or an Envelope Tracking (ET) mode;

the radio frequency power supply parameter comprises at least one of a power supply voltage, a Radio frequency Gain Index (RGI) value, a collector current at a quiescent operation point (ICQ), an RGI range, a compression point, a Vmin value, or a Vmax value; and the power source concurrent interference suppression coexistence parameter comprises at least one of a coexistence power control parameter, a coexistence bandwidth limit parameter, a coexistence power source power supply mode matching parameter, a coexistence power source parameter matching parameter, a coexistence power amplifier (PA) operating mode parameter, or a coexistence isolation improvement parameter.

4. The method of claim 1, wherein acquiring radio frequency interference information comprises:

acquiring a wireless performance parameter;

comparing the wireless performance parameter with a preset wireless performance parameter; and determining according to a result of the comparison that radio frequency interference exists, and generating the radio frequency interference information.

5. The method of claim 4, wherein the wireless performance parameter comprises at least one of:

a Reference Signal Receiving Power (RSRP) value, a Received Signal Strength Indication (RSSI) value, a Signal Noise Ratio (SNR) value, a Channel Quality Indication (CQI) value, an uplink/downlink bit error rate, a Modulation and Coding Scheme (MCS) modulation mode, a rank, an Error Vector Magnitude (EVM), an Adjacent Channel Leakage Ratio (ACLR), or sensitivity.

6. The method of claim 1, wherein adjusting the radio frequency power supply status according to the correlation information comprises:

adjusting and calling calibration parameters in a calibration parameter set according to the correlation information to adjust the radio frequency power supply status, wherein the calibration parameter set is generated from different radio frequency power supply statuses through calibration mapping;

monitoring the wireless performance parameter in real time; and selecting a corresponding calibration parameter when the wireless performance parameter reaches a preset condition, to adjust the radio frequency power supply status.

7. The method of claim 1, wherein adjusting the radio frequency power supply status according to the correlation information comprises:

calling a calibration parameter set according to the correlation information and a preset relationship mapping table, to adjust the radio frequency power supply status, wherein the calibration parameter set is generated from different radio frequency power supply statuses through calibration mapping, and the relationship mapping table comprises a correspondence between the correlation information and the calibration parameter set.

8. The method of claim 1, wherein adjusting the radio frequency power supply status according to the correlation information comprises:

acquiring the correlation information and a wireless performance parameter using a logic gate circuit;

controlling a single-pole multi-throw switch to switch between radio frequency power supply modes in sequence using the logic gate circuit according to the correlation information and the wireless performance parameter, to adjust the radio frequency power supply mode; and calling calibration parameter sets in sequence in each of radio frequency power supply modes to adjust a radio frequency power supply parameter.

9. The method of claim 1, wherein the method is applied to an electronic device with multiple sets of radio frequency modules, and the multiple sets of radio frequency modules comprise at least one of a 5G radio frequency module, a 4G radio frequency module, a 3G radio frequency module, a 2G radio frequency module, a Wi-Fi radio frequency module, or a GPS radio frequency module.

10. The method of claim 9, wherein the multiple sets of radio frequency modules comprise at least two sets of radio frequency modules; and the radio frequency power supply status comprises a power source concurrent interference suppression coexistence parameter;

acquiring radio frequency interference information comprises:

acquiring a wireless performance parameter;

comparing the wireless performance parameter with a preset wireless performance parameter;

determining, according to a result of the comparison, that radio frequency interference exists; and detecting and determining, according to the radio frequency interference, whether the radio frequency interference is power source concurrent interference, and generating the radio frequency interference information; and correspondingly, adjusting the radio frequency power supply status according to the correlation information comprises:

controlling the power source concurrent interference suppression coexistence parameters of at least two power conversion chips of the at least two sets of radio frequency modules according to the correlation information, respectively.

11. A non-transitory computer-readable storage medium, storing a computer-executable instruction for performing the radio frequency power supply adjustment method of claim 1.

12. A radio frequency power supply adjustment apparatus, comprising:

an acquisition module, configured for acquiring radio frequency interference information;

a correlation information determination module, configured for determining, according to the radio frequency interference information, correlation information between the radio frequency interference information and a radio frequency power supply status; and a power supply status adjustment module, configured for adjusting the radio frequency power supply status according to the correlation information;

wherein the correlation information comprises a correlation coefficient; and determining, according to the radio frequency interference information, correlation information between the radio frequency interference information and a radio frequency power supply status comprises:

testing a change of a wireless performance parameter under different radio frequency power supply statuses according to the radio frequency interference information; and determining a correlation coefficient between the radio frequency interference information and the radio frequency power supply statuses according to the change.

13. The apparatus of claim 12, wherein the power supply status adjustment module comprises:

a logic gate circuit, configured for acquiring the correlation information and a wireless performance parameter, and outputting a control signal according to the correlation information and the wireless performance parameter;

a single-pole multi-throw switch, connected to the logic gate circuit and configured for switching between radio frequency power supply modes according to the control signal; and a parameter adjustment module, configured for calling calibration parameter sets in sequence in each of the radio frequency power supply modes to adjust a radio frequency power supply parameter.

14. An electronic device, comprising: a memory, a processor, and a computer program stored in the memory and executable by the processor which, when executed by the processor, causes the processor to perform a radio frequency power supply adjustment method comprising:

acquiring radio frequency interference information;

determining, according to the radio frequency interference information, correlation information between the radio frequency interference information and a radio frequency power supply status; and adjusting the radio frequency power supply status according to the correlation information;

wherein the correlation information comprises a correlation coefficient; and determining, according to the radio frequency interference information, correlation information between the radio frequency interference information and a radio frequency power supply status comprises:

testing a change of a wireless performance parameter under different radio frequency power supply statuses according to the radio frequency interference information; and determining a correlation coefficient between the radio frequency interference information and the radio frequency power supply statuses according to the change.

15. The electronic device of claim 14, wherein acquiring radio frequency interference information comprises:

acquiring a wireless performance parameter;

comparing the wireless performance parameter with a preset wireless performance parameter; and determining according to a result of the comparison that radio frequency interference exists, and generating the radio frequency interference information.

16. The electronic device of claim 14, wherein adjusting the radio frequency power supply status according to the correlation information comprises:

adjusting and calling calibration parameters in a calibration parameter set according to the correlation information to adjust the radio frequency power supply status, wherein the calibration parameter set is generated from different radio frequency power supply statuses through calibration mapping;

monitoring the wireless performance parameter in real time; and selecting a corresponding calibration parameter when the wireless performance parameter reaches a preset condition, to adjust the radio frequency power supply status.

17. The electronic device of claim 14, wherein adjusting the radio frequency power supply status according to the correlation information comprises:

calling a calibration parameter set according to the correlation information and a preset relationship mapping table, to adjust the radio frequency power supply status, wherein the calibration parameter set is generated from different radio frequency power supply statuses through calibration mapping, and the relationship mapping table comprises a correspondence between the correlation information and the calibration parameter set.

18. The electronic device of claim 14, wherein adjusting the radio frequency power supply status according to the correlation information comprises:

acquiring the correlation information and a wireless performance parameter using a logic gate circuit;

controlling a single-pole multi-throw switch to switch between radio frequency power supply modes in sequence using the logic gate circuit according to the correlation information and the wireless performance parameter, to adjust the radio frequency power supply mode; and calling calibration parameter sets in sequence in each of radio frequency power supply modes to adjust a radio frequency power supply parameter.

* * * * *